United States Patent
Hebel et al.

(10) Patent No.: US 10,277,907 B2
(45) Date of Patent: Apr. 30, 2019

(54) RATE-DISTORTION OPTIMIZERS AND OPTIMIZATION TECHNIQUES INCLUDING JOINT OPTIMIZATION OF MULTIPLE COLOR COMPONENTS

(71) Applicant: Integrated Device Technology, Inc., San Jose, CA (US)

(72) Inventors: Krzysztof Hebel, Kitchener (CA); Alexandros Tourapis, Milpitas, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 1187 days.

(21) Appl. No.: 13/660,803

(22) Filed: Oct. 25, 2012

(65) Prior Publication Data

US 2014/0119454 A1    May 1, 2014

(51) Int. Cl.
*H04N 11/04* (2006.01)
*H04N 19/18* (2014.01)
(Continued)

(52) U.S. Cl.
CPC ............ *H04N 19/18* (2014.11); *H04N 19/147* (2014.11); *H04N 19/156* (2014.11); *H04N 19/17* (2014.11); *H04N 19/186* (2014.11)

(58) Field of Classification Search
CPC .... H04N 19/12; H04N 19/122; H04N 19/147; H04N 19/18; H04N 19/186
(Continued)

(56) References Cited

U.S. PATENT DOCUMENTS 6,088,392 A   7/2000 Rosenberg
6,519,361 B1  2/2003 Taillie et al.
(Continued)

FOREIGN PATENT DOCUMENTS

JP   2004-134911      4/2004
JP   2010226528 A    10/2010
(Continued)

OTHER PUBLICATIONS

Detlev Marpe, Heiner Kirchhoffer, Valeri George, Peter Kauff, and Thomas Wiegand "An Adaptive Color Transform Approach and Its Application in 4:4:4 Video Coding", 14th European Signal Processing Conference (EUSIPCO 2006), Florence, Italy, Sep. 4-8, 2006, copyright by EURASIP (Year: 2006).*
(Continued)

*Primary Examiner* — William C Vaughn, Jr.
*Assistant Examiner* — Naod W Belai
(74) *Attorney, Agent, or Firm* — Christopher P. Maiorana, PC

(57) ABSTRACT

Examples of encoders and video encoding are described that include optimizers and techniques for optimizing syntax elements such as transform coefficients. In some examples, multiple color components of a video signal may be jointly optimized by employing a cost calculation using a combination of distortion and/or rate metrics for multiple color components. In some examples, a color transformation may occur and the optimization may take place in a different color domain than encoding. In some examples, distortion metrics used in the cost calculations performed by optimizers are based on structural similarity index.

21 Claims, 7 Drawing Sheets

(51) Int. Cl.
*H04N 19/147* (2014.01)
*H04N 19/186* (2014.01)
*H04N 19/156* (2014.01)
*H04N 19/17* (2014.01)

(58) Field of Classification Search
USPC .............................. 375/18, 240.18, E7.026
See application file for complete search history.

(56) References Cited

U.S. PATENT DOCUMENTS

| | | | |
|---|---|---|---|
| 7,570,827 B2 | 8/2009 | Yang et al. | |
| 2004/0264787 A1* | 12/2004 | Jia | H04N 19/59 382/233 |
| 2005/0201463 A1 | 9/2005 | Lee et al. | |
| 2006/0039479 A1 | 2/2006 | Francois et al. | |
| 2006/0285594 A1 | 12/2006 | Kim et al. | |
| 2007/0071105 A1 | 3/2007 | Tian et al. | |
| 2007/0183500 A1 | 8/2007 | Nagaraj et al. | |
| 2007/0237226 A1* | 10/2007 | Regunathan | H04N 19/567 375/240.12 |
| 2008/0181308 A1 | 7/2008 | Wang et al. | |
| 2008/0192821 A1 | 8/2008 | Malayath et al. | |
| 2008/0298464 A1 | 12/2008 | Hinz et al. | |
| 2008/0310502 A1 | 12/2008 | Kim et al. | |
| 2009/0168894 A1* | 7/2009 | Marpe | H04N 9/67 375/240.24 |
| 2009/0257489 A1 | 10/2009 | Karczewicz et al. | |
| 2009/0257502 A1 | 10/2009 | Ye et al. | |
| 2010/0008417 A1 | 1/2010 | Xu et al. | |
| 2010/0046614 A1 | 2/2010 | Choi et al. | |
| 2010/0142622 A1 | 6/2010 | Le Leannec et al. | |
| 2010/0208989 A1* | 8/2010 | Narroschke | H04N 1/646 382/166 |
| 2011/0150076 A1 | 6/2011 | Wang et al. | |
| 2011/0164677 A1* | 7/2011 | Lu | H04N 19/176 375/240.02 |
| 2011/0170591 A1 | 7/2011 | Li et al. | |
| 2011/0261878 A1 | 10/2011 | Lu et al. | |
| 2012/0051636 A1 | 3/2012 | Greenebaum et al. | |
| 2012/0140822 A1 | 7/2012 | Wang et al. | |
| 2012/0183051 A1 | 7/2012 | Zhang | |
| 2012/0201475 A1 | 8/2012 | Carmel et al. | |
| 2012/0201476 A1* | 8/2012 | Carmel | H04N 19/176 382/239 |
| 2012/0301040 A1 | 11/2012 | Yie et al. | |
| 2013/0083855 A1* | 4/2013 | Kottke | H04N 19/46 375/240.18 |
| 2013/0089137 A1 | 4/2013 | Korman et al. | |
| 2013/0101031 A1 | 4/2013 | Van der Auwera et al. | |
| 2014/0086314 A1 | 3/2014 | Krzysztof et al. | |
| 2014/0119432 A1* | 5/2014 | Wang | H04N 19/176 375/240.2 |
| 2014/0168362 A1 | 6/2014 | Hannuksela et al. | |
| 2014/0219331 A1 | 8/2014 | Pai et al. | |
| 2014/0219346 A1 | 8/2014 | Ugur et al. | |
| 2015/0085922 A1 | 3/2015 | Hebel et al. | |
| 2015/0373326 A1 | 12/2015 | Hebel | |

FOREIGN PATENT DOCUMENTS

| | | |
|---|---|---|
| JP | 2011176483 A | 9/2015 |
| KR | 2007-0110636 | 11/2007 |
| KR | 2012-0005931 | 1/2012 |
| WO | 2010036772 A2 | 1/2010 |
| WO | 2014123741 | 8/2014 |

OTHER PUBLICATIONS

Office Action received for JP Patent Appl 2015-538154 dated Mar. 29, 2016.
Rehman, et al., "SSIM-Inspired Perceptual Video Coding for HEVC, 2012 IEEE International Conference on Multimedia and Expo", IEEE, Jul. 2012, pp. 497 to 502, Jul. 2012.
Wang, et al., "SSIM-Motivated Rate-Distortion Optimization for Video Coding, IEEE Transactions on Circuits and Systems for Video Technology", IEEE, Apr. 2012, vol. 22, No. 4, pp. 516 to 529, Apr. 2012.
First Office Action received for Canadian Application No. 2886995 dated Apr. 22, 2016.
Ribas-Corbera, Jordi et al., "Rate Control in DCT Video Coding for Low-Delay Communications", IEEE Transactions on Circuits and Systems for Video Technology, vol. 9, No. 1, Feb. 1999, Feb. 1999, 172-185.
Kameyama, Wataru et al., "Impress Standard Textbook Series: Digital Broadcasting Textbook in IPTV Era", first edition, edited by Wataru Kameyama and one other, Tokyo: Impress R&D, Apr. 1, 2010, 102-109, 114, 120, 121, 128-133; ISBN: 978-4-8443-2853-7.
Tamiya, Ichiro et al., "One-Chip MPEG 2 Video Encoder LSI μPD61050", NEC Technical Journal, vol. 52, No. 3, NEC Corporation, Mar. 25, 1999, 85-88. ISSN: 0285-4139.
Yasuda, Hiroshi et al., "Digital Broadcasting/Information Compression Technique for Internet", first edition, translated and edited by Hiroshi Yasuda and one other, Tokyo: Kyoritsu Shuppan, Jun. 10, 1999, 165-167; ISBN: 4-320-02936-4.
International Search Report & Written Opinion for Appl No. PCT/US2013/066354, dated Jan. 28, 2014.

* cited by examiner

RATE-DISTORTION OPTIMIZERS AND OPTIMIZATION TECHNIQUES INCLUDING JOINT OPTIMIZATION OF MULTIPLE COLOR COMPONENTS

TECHNICAL FIELD

Embodiments of the invention relate generally to video encoding, and some examples describe optimization techniques, including for example, methods and systems for calculating distortion.

BACKGROUND

Video or other media signals may be used by a variety of devices, including televisions, broadcast systems, mobile devices, and both laptop and desktop computers. Typically, devices may display or transmit video in response to receipt of video or other media signals, often after decoding the signal from an encoded form. Video signals provided between devices are often encoded using one or more of a variety of encoding and/or compression techniques, and video signals are typically encoded in a manner to be decoded in accordance with a particular standard, such as MPEG-2, MPEG-4, and H.264/MPEG-4 Part 10. By encoding video or other media signals, then decoding the received signals, the amount of data needed to be transmitted between devices may be significantly reduced.

Video encoding is typically performed by encoding 16-by-16 pixel blocks called macroblocks, or other units, of video data. Prediction coding may be used to generate predictive blocks and residual blocks, where the residual blocks represent a difference between a predictive block and the block being coded. Prediction coding may include spatial and/or temporal predictions to remove redundant data in video signals, thereby further increasing the reduction of data needed to be sent or stored. Intracoding for example, is directed to spatial prediction and reducing the amount of spatial redundancy between blocks in a frame or slice. Intercoding, on the other hand, is directed toward temporal prediction and reducing the amount of temporal redundancy between blocks in successive frames or slices. Intercoding may make use of motion prediction to track movement between corresponding blocks of successive frames or slices.

Typically, syntax elements, such as coefficients and motion vectors, may be encoded using one of a variety of encoding techniques (e.g., entropy encoding) and subsequently transmitted between the encoding device and the decoding device. In addition, several approaches may further attempt to optimize syntax elements (e.g. motion vectors, modes, transform coefficients, etc.). Many video encoding methodologies make use of some form of trade off between an achievable data rate and the amount of distortion present in a decoded signal. Trellis optimization techniques may be used to identify an optimal set of syntax elements (e.g. coefficients) that have a minimum rate-distortion cost. Traditional optimization techniques, which also may be referred to as dynamic programming, may encode syntax elements while considering multiple possible coding candidates (e.g. states) for the syntax elements. Optimal states may be selected that lead to a minimum overall cost.

SUMMARY

Examples of encoders and video encoding are described that include optimizers and techniques for optimizing syntax elements such as transform coefficients. In some examples, multiple color components of a video signal may be jointly optimized by employing a cost calculation using a combination of distortion and/or rate metrics for multiple color components. In some examples, a color transformation may occur and the optimization may take place in a different color domain than encoding. In some examples, distortion metrics used in the cost calculations performed by optimizers are based on structural similarity index.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known video components, encoder or decoder components, circuits, control signals, timing protocols, and software operations have not been shown in detail in order to avoid unnecessarily obscuring the described embodiments of the invention.

Figure 1:
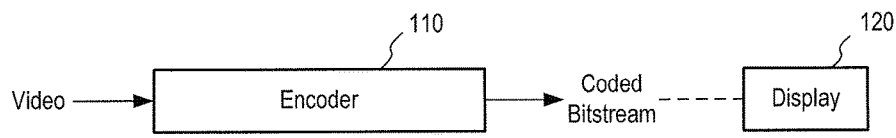
FIG. 1 is a block diagram of an encoder 100 according to an embodiment of the invention.

FIG. 1 is a block diagram of an encoder 100 according to an embodiment of the invention. The encoder 100 may include one or more logic circuits, control logic, logic gates, processors, memory, and/or any combination or sub-combination of the same, and may be configured to encode and/or compress a video signal using one or more encoding techniques, examples of which will be described further below. The encoder 100 may be configured to encode, for example, a variable bit rate signal and/or a constant bit rate signal, and generally may operate at a fixed rate to output a bitstream that may be generated in a rate-independent manner. The encoder 100 may be implemented in any of a variety of devices employing video encoding, including but not limited to, personal video recorders, broadcast systems, mobile devices, both laptop and desktop computers, and clusters of computing nodes. In at least one embodiment, the encoder 100 may include an entropy encoder, such as a variable-length coding encoder (e.g., Huffman encoder, CAVLC, or CABAC encoder), and/or may be configured to encode data, for instance, at a macroblock level. Each macroblock may be encoded in intra-coded mode, inter-coded mode, bidirectionally, or in any combination or subcombination of the same. The encoded bitstream may be provided to a decoder (not shown in FIG. 1) through any mechanism of electronic communication, wired or wireless, and may be decoded and ultimately displayed, e.g. on display 120 for viewing. The encoded bitstream may also be stored at any point instead of, or in addition to, being displayed on the display 120.

As an example, the encoder 100 may receive and encode a video signal that in one embodiment, may include video data (e.g., frames). Video signals generally refer to electronic data representative of a portion of video. Video signals may refer to stored data and/or transmitted signals. The video signal may be received over a network, or may represent data retrieved from an electronic memory or storage device. The video signal may be encoded in accordance with one or more encoding standards, such as MPEG-2, MPEG-4, H.263, H.264, and/or H.HEVC, to provide an encoded bitstream, which may in turn be provided to a data bus and/or to a device, such as a decoder or transcoder (not shown). As will be explained in more detail below, a video signal may be encoded by the encoder 100 such that a rate-distortion tradeoff of syntax elements may be optimized. In some embodiments, for example, distortion may be calculated using multiple color components, rather than analyzing each color component of a video signal in isolation. In some examples, distortion may be calculated in a color space to be used to display the video (e.g. RGB) rather than in the color space the video signal is provided in (e.g. YUV or YCbCr).

As known, syntax elements generally refer to symbols that may be used in a bitstream to provide a compressed representation of a video signal. Syntax elements may include one or more elements of a video signal having syntax in accordance with one or more coding standards, such as but not limited to transform coefficients, motion vectors, modes, and may occur at various levels of a syntax hierarchy (e.g. sequence, frame, or block). Moreover, rate-distortion optimization may refer to a process designed to select a particular rate-distortion trade-off where a sufficient rate is maintained with an allowable amount of distortion. Rate-distortion cost function may typically be represented by a lambda factor λ, or lambda, multiplied by the rate and the product added to the distortion, as illustrated by the following formula:

$$J = D + \lambda * R,$$

where J represents the rate-distortion cost, or "RD score," for one or more syntax elements such as a coefficient. Alternatively, the formula may be expressed as the following:

$$J = D * \lambda^{-1} + R$$

Embodiments of the present invention may utilize particular computations for distortion, and/or may calculate cost using multiple color components, and/or may convert the syntax elements from one color space to another to perform the rate-distortion optimization, as will be described further below. Generally, encoding methods may aim to minimize the RD score, for example, for a given bit rate. However, encoding methods may select syntax elements generating RD scores meeting any criteria (e.g. minimum score, maximum score, second-to-minimum score, etc.) Lambda may be determined by the encoder 100, may be provided by a device, such as a decoder, transcoder, or logic circuit (not shown), or may be specified by a user.

Figure 2:
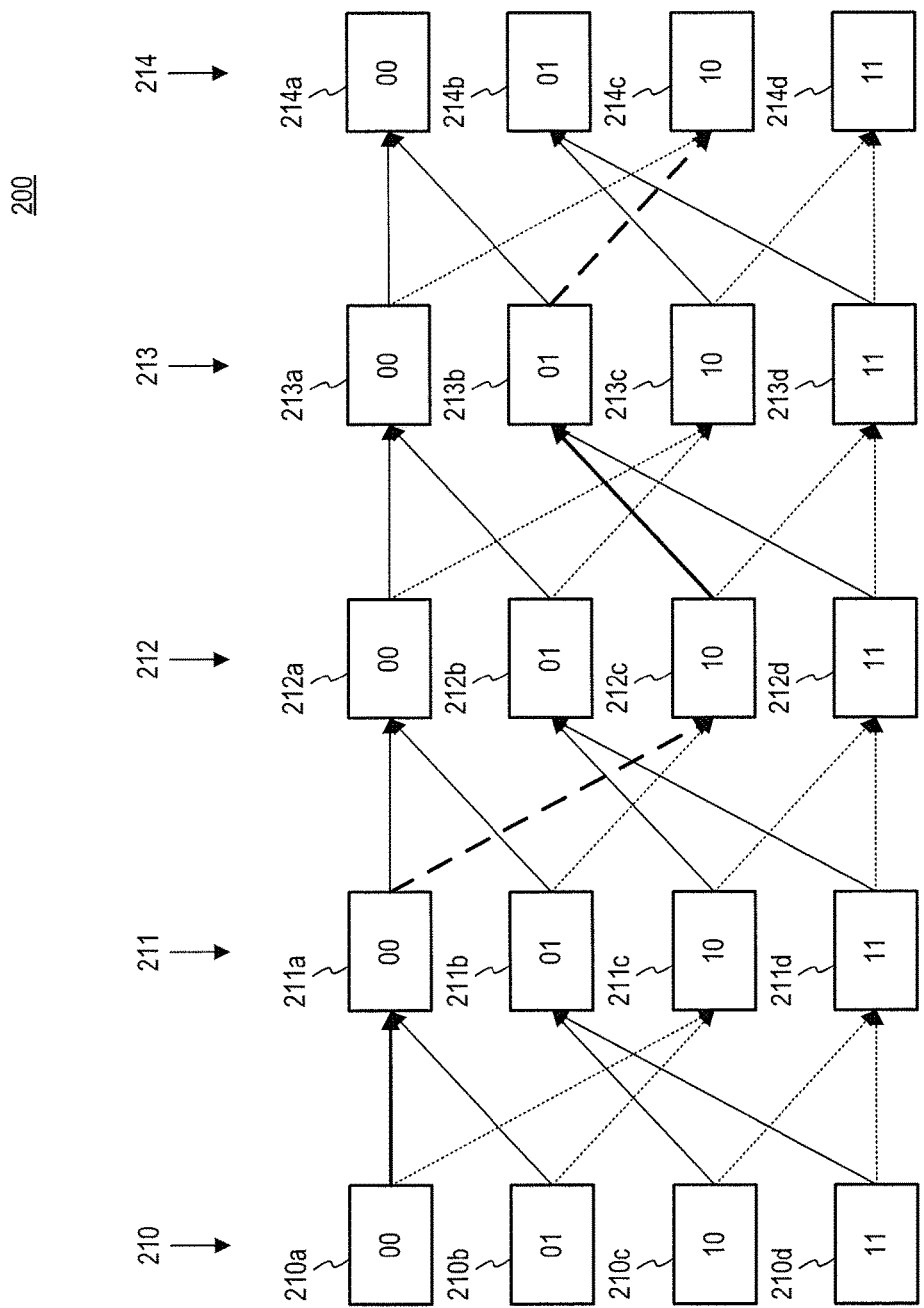
FIG. 2 is a schematic illustration of a trellis diagram arranged in accordance with an embodiment of the present invention.

FIG. 2 is a schematic illustration of a trellis diagram arranged in accordance with an embodiment of the present invention. Trellis optimization techniques may be used to optimize syntax elements. Generally, trellis optimization refers to a process of considering each portion of a syntax element (e.g. a transform coefficient) as a node (which may also be referred to as a cell) that may have any of multiple states. FIG. 2 illustrates a trellis diagram 200 having five nodes 210-214. Each of the five nodes may have one of four states 210a-d, 211a-d, 212a-d, 213a-d, and 214a-d, respectively. For example, for the node 210, the possible states are 210a '00', 210b '01', 210c '10', and 210d '11'. Portions of the syntax element (e.g. transform coefficient) may be dependent, resulting in only certain allowable transitions between states, reflected by the arrows in FIG. 2. So, for example, if the node 210 were to be assigned state 210a ('00'), the node 211 may only take on states 211a ('00') or 211c ('10'), as indicated by the arrows between 210a and 211a and 211c. The acceptable state transitions may be stored and accessible to embodiments of encoders described herein. Encoders described herein, which may include optimizers configured to perform trellis optimization, may calculate a cost for each state of each node. The cost may be calculated based on a resulting distortion from use of that state at that node as well as a bitrate. Costs may be calculated for all states of all nodes prior to locating an optimal path (e.g. set of states for each nodes) or costs may be calculated for some nodes and states, and an optimization performed before all nodes or states had a cost calculated in some examples.

A path (e.g. set of states for each node) may then be selected by the optimizer having a minimal total cost. For example, a path may be selected such that the sum of all costs of states of the nodes along the path yields a minimum total cost. In the example of FIG. 2, the selected path is indicated by the bold arrows—from 210a to 211a to 212c to 213b to 214c. Any of a variety of known path searching techniques may be used to identify the minimal cost path. Accordingly, the syntax element or portion thereof identified in the example of FIG. 2 would be {00}, {00}, {10}, {01}, and {10}. While five nodes and four states per node are shown in FIG. 2, any number of nodes and states may be used in other examples.

The use of trellis optimization techniques is common in video encoding, including when performing quantization of transform coefficients in a block or macroblock. Trellis optimization techniques may be used, for example, in MPEG-1, MPEG-2, H.263, H/264/MPEG-4 AVC, HEVC, and codecs such as, but not limited to VC-1 and VP8. The nodes 210-214 of FIG. 2 may represent, for example, different transform coefficients, and the states may represent, for example, the different possible values that each coefficient may take after quantization. Because the coefficients are entropy encoded, a decision in one coefficient may impact the cost (e.g. the bits) of another coefficient. Examples of conventional cost calculations were described above and include $J = D + \lambda * R$ and $J = D * \lambda^{-1} + R$ where R corresponds to the bitrate cost of coding that coefficient and D corresponds to the distortion, which is typically calculated using a sum of square error (SSE) or sum of absolute difference (SAD) introduced to that coefficient given its original value, and λ is the Langrangian multiplier. The path considered optimal may then be the one that results in minimization of the overall cost, e.g.

$$J_{overall} = \sum_i (D_i + \lambda * R_i);$$

where i denotes each node.

However, existing techniques typically compute the cost for one or each color component individually. Accordingly, interplay on distortion between color components may not be accounted for. Moreover, existing techniques typically compute the distortion only in the domain in which the data is encoded. For example, video signals (e.g. data) may be in a YUV/YCbCr color representation during coding the data. Accordingly, an optimizer may calculate the distortion in the YUV/YCbCr domain, and select optimal coefficients or other syntax elements on the basis of those distortion calculations performed in the YUV/YCbCr domain. However, ultimately, the video may be converted to an RGB color representation for display, e.g. on the display 120 of FIG. 1. The impact of the distortion calculation in one color domain but display in another may not be negligible, for example considering clipping operations and the upsampling process of chroma components in examples of 4:2:0 or 4:2:2 data to full resolution. Because of clipping operations, for example, the process of converting the encoded data, encoded in YUV space to RGB may not be truly linear, and accordingly, quality may be impacted by using distortion calculations from the YUV domain.

Figure 3:
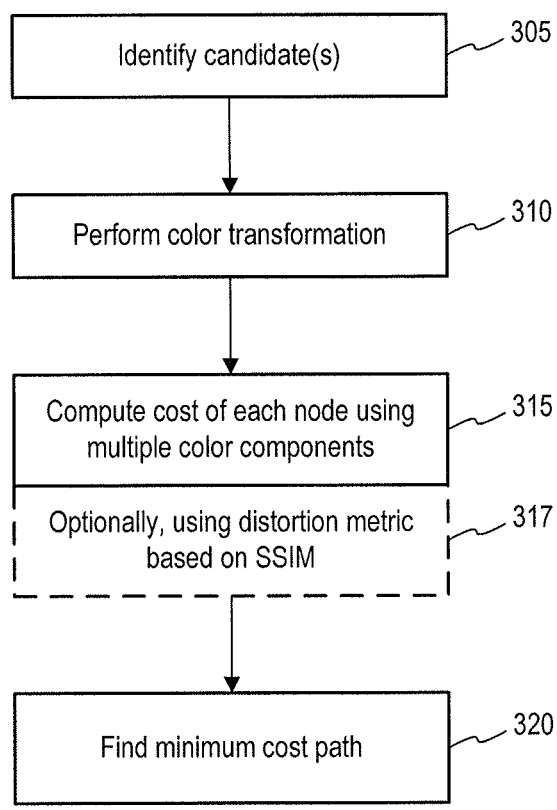
FIG. 3 is a flowchart of a method for optimizing syntax elements arranged in accordance with an embodiment of the present invention.

Accordingly, in some embodiments optimizers may calculate a cost for one or more nodes of a trellis optimization where the cost includes a sum of distortions and/or rates caused by each of multiple color components. FIG. 3 is a flowchart of a method for optimizing syntax elements arranged in accordance with an embodiment of the present invention. The method 300 includes steps which may be performed in the order shown, or in some examples certain of the steps shown may be performed in a different order. In block 305, candidates may be identified (e.g. states for the nodes shown in FIG. 2 and/or the allowable paths between states). Candidates may be identified in any suitable manner. For example, candidates for coefficients may be identified by utilizing the output of a standard quantizer and generating a set of candidates for each coefficient by applying a specified offset, e.g. ±1, ±2, and/or ±3. In block 310, a color transformation may be performed in some embodiments. The color transformation may generally transform the video signal (e.g. video data) from one color domain to another. Color domains include, but are not limited to RGB and YUV/YCrCb. Generally, the color transformation may be from a color domain in which encoding is performed to a color domain in which the video is to be displayed. So, for example, in an encoder that typically encodes video in a YUV color domain but the video is typically to be displayed in RGB, a color transformation may occur in step 310 from YUV to RGB. To perform the color transformation, in some examples the color transformation may be approximated as a linear process and a coefficient or distortion in one color domain may be transformed to another color domain by multiplication with color conversion parameters, which may be stored or otherwise accessible to an optimizer performing the method 300 of FIG. 3.

The color transformation 310 may in some examples occur before identifying candidates 305, and may in some examples occur as part of block 315, where a cost of each node may be computed using multiple color components. For example, embodiments of the present invention calculate a rate-distortion cost of nodes using a combination of distortions and/or rates calculated for multiple color components, rather than optimizing each color component individually. Examples of computations that may be performed in block 315 are described further below.

Block 317 indicates that the cost computation in block 315 may in some examples be performed using a distortion metric based on a structural similarity index (SSIM). The structural similarity index is generally characterized by a brightness component and a variance (e.g. activity) component. Accordingly, an SSIM may be used to calculate distortion as opposed to traditional SSE or SAD metrics.

Following computation of costs for some or all of the nodes, in block 320 a minimum cost path may be identified. The minimum cost path may be identified using any number of path searching methodologies known in the art or hereafter developed. In other examples, a path having other than the minimum cost may be identified in block 320.

Referring back to block 315, the cost of nodes may be computed using multiple color components. For example, an overall cost may be computed which takes into consideration multiple color components at that node. In some example, the cost computation may utilize a sum of distortions generated by the coefficient in multiple color components. In the YUV color domain, the total cost may accordingly be calculated as follows:

$$J_{overall} = \sum_i (D_i^Y + D_i^U + D_i^V) + \lambda * (R_i^Y + R_i^U + R_i^V);$$

where $D^Y$, $D^U$, and $D^V$ represent distortion related to the Y, U, and V color components respectively, and $R^Y$, $R^U$, and $R^V$ represent rate of the Y, U, and V color components respectively. Such an example may not reflect any color transformation, and indeed in some examples, no color transformation may be used (e.g. the block 310 of FIG. 3 may not be performed). Rather, the optimization seeks to minimize an overall cost due to a combination of rates and distortions from multiple color components of any color domain.

In other examples, the color transformation may occur as part of the cost computation in block 315. For example, a total cost may be calculated as follows in some examples:

$$J_{overall} = \sum_i \left( \sum_j (a_j * D_i^Y + b_j * D_i^U + c_j * D_i^V) + \lambda * (R_i^Y + R_i^U + R_i^V) \right)$$

where $a_j$, $b_j$, and $c_j$ are the color conversion parameters to convert the calculated distortions from one color domain (e.g. YUV) to another (e.g. RGB). Accordingly, distortions may be calculated using coefficients in a YUV or other color domain, and then multiplied by a color conversion parameter to convert the distortion to a value relevant to the RGB domain. Multiplication by the color conversion parameters models the color transform as a linear process, which may ignore or simplify saturation and quantization of the actual color transform. In other examples, a full color transform may be applied, and/or a more detailed model may be applied to the distortion values.

The cost computations described herein may be complex, and accordingly in some embodiments, the cost computations using multiple color components may be performed for only DC coefficients of a block. For example, transformed and quantized DC coefficients may be further transformed using a color transformation in block 310. In block 315 of FIG. 3, cost may be computed only for nodes related to DC coefficients of a block. and in block 320 of FIG. 3, optimal DC coefficients may be identified in a minimum cost path.

Moreover, in some examples not all color components may be jointly used to compute a cost. In some examples, only certain color components of all the color components in a video signal (e.g. video data) may be jointly used to compute a rate-distortion cost. For example, luma components may be optimized in isolation using a cost equation involving only the luma components. The two chroma components may then be jointly optimized by using a cost equation that sums distortion related to the two chroma components. For example a suitable cost equation in one example is:

$$J_{chroma} = \sum_i \left( \sum_j (b_j * D_i^U + c_j * D_i^V) + \lambda * (R_i^U + R_i^V) \right)$$

where $b_j$ and $c_j$ represent color conversion parameters for the chroma components.

In this manner, additional computational resource for joint optimization may only be employed on the two chroma components, while the luma components may be optimized separately.

In the cost computations described herein, distortion may be calculated in any manner known or hereafter developed for distortion computation, such as sum of square error (SSE) or sum of absolute difference (SAD) methods. However, in some examples a distortion metric based on a structural similarity index (SSIM) may be used, such as in block 317 of FIG. 3. The SSIM may generally represent a video signal using a brightness component and a variance or activity component. Using a SSIM representation may allow optimization of the brightness and distortion separately. For example, an SSIM may be represented as follows:

$$SSIM(x, y) = \frac{(2E(x)E(y) + c_1) * (Cov(x, y) + c_2)}{(E(x)^2 + E(y)^2 + c_1) * (Var(x) + Var(y) + c_2)}$$

where $E(x)$ refers to a mean of the video signal, $Cov(x,y)$ to a covariance, and $Var(x)$ to a variance. $c_1$ and $c_2$ are variables that may be used in examples having division by too weak of a denominator.

The mean (e.g. $E(x)$) may be primarily impacted by a DC value of the video signal and the variance and covariance may be primarily impacted by AC coefficients of the video signal. Accordingly, optimizing a DC coefficient may optimize a mean while optimizing AC coefficients may optimize a covariance and/or variance. Accordingly, instead of or in addition to the use of SSE or SAD as a distortion metric, distortion metrics for SSIM quantities may be used. Brightness distortion may be expressed in terms of means, for example as follows:

$$BDist(x, y) = \frac{(2E(x)E(y) + c_1)}{(E(x)^2 + E(y)^2 + c_1)}$$

Texture distortion may be expressed in terms of variance and covariance, for example as follows:

$$TDist(x, y) = \frac{(Cov(x, y) + c_2)}{(Var(x) + Var(y) + c_2)}$$

The brightness distortion may be easier to compute because it may involve consideration of a DC coefficient only. Examples of candidate generation for DC coefficients that may be used according to examples of the present invention, including examples utilizing MPEG-2 encoding, include those described in co-pending U.S. patent application Ser. No. 13/627,776, filed Sep. 26, 2012, entitled "Apparatuses and methods for optimizing rate-distortion of syntax elements," filed naming Krzysztof Hebel, Eric Pearson, and Pavel Novotny as co-inventors, which application is hereby incorporated by reference in its entirety for any purpose. Instead of using a distortion calculation in accordance with a SAD criteria in a cost calculation in some examples of the present invention, the brightness distortion metric may be used. The difference in computation of these metrics may be seen as follows: Using sum of absolute difference (SAD), the distortion may be calculated as |(DC-$Q^{-1}(Q(DC))$)|, where DC is the DC coefficient and Q represents a forward quantization process, $Q^{-1}$ an inverse quantization process, respectively. The SAD distortion metric thus involves subtraction of a quantized, then inverse quantized DC coefficient from the DC coefficient. However, the brightness distortion metric may be expressed as:

$$\frac{(2*DC*Q^{-1}(Q(DC)) + c_1)}{((DC)^2 + (Q^{-1}(Q(DC)))^2 + c_1)}$$

Accordingly, a brightness distortion metric may be used when computing costs in block 315 of FIG. 3. In some examples, a texture metric may additionally be used by computing covariance and variance of the AC coefficients. However, in some examples, AC coefficients may be optimized in accordance with the method of FIG. 3 using a SAD or SSE distortion metric, while the DC coefficient may be optimized using a SSIM metric.

Figure 4:
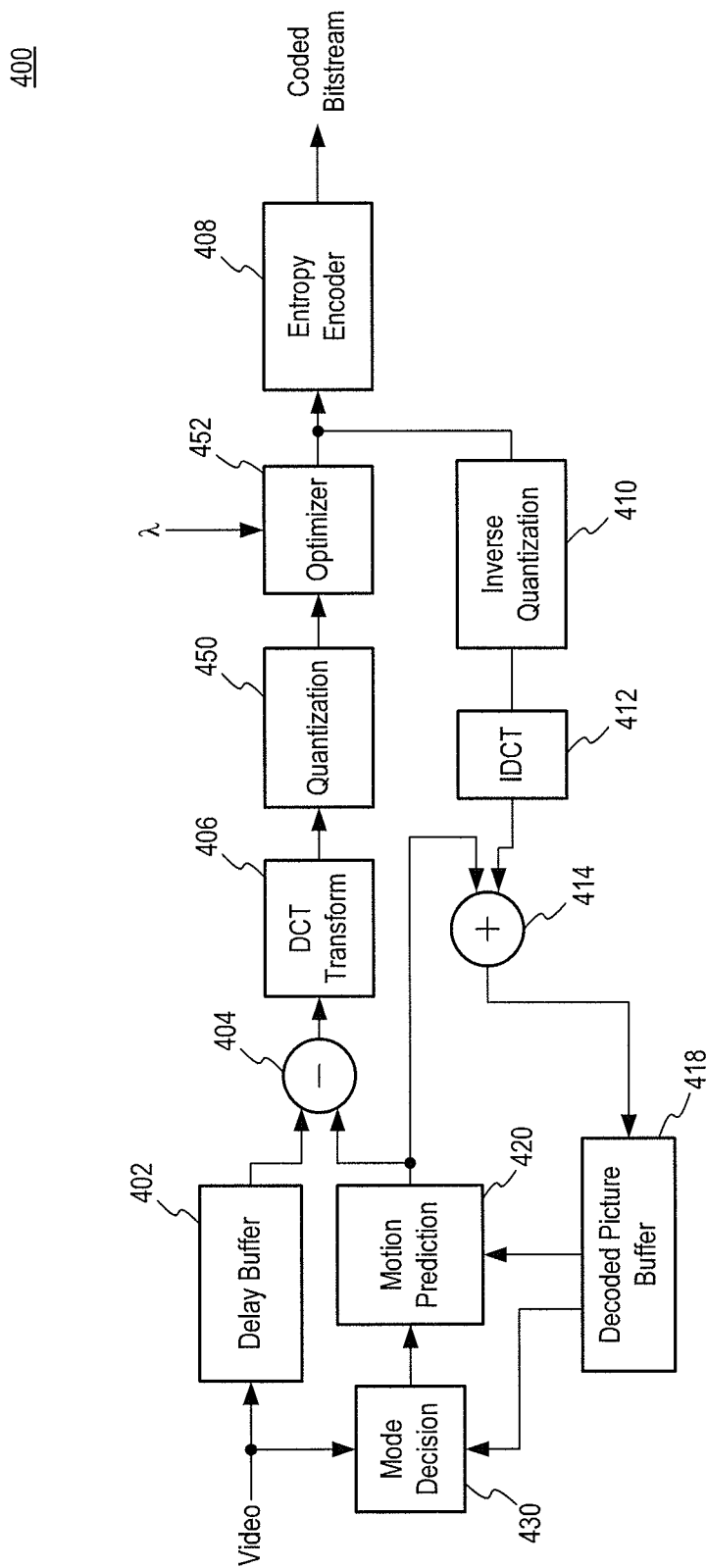
FIG. 4 is a schematic block diagram of an encoder according to an embodiment of the present invention.

FIG. 4 is a schematic block diagram of an encoder 400 according to an embodiment of the invention. The encoder 400 may be used to implement, at least in part, the encoder 100 of FIG. 1. The encoder 400 may include a mode decision block 430, a prediction block 420, a delay buffer 402, a transform 406, a quantization block 450, an optimizer 452, an entropy encoder 408, an inverse quantization block 410, an inverse transform block 412, an adder 414, and a decoded picture buffer 418. The mode decision block 430 may be configured to determine an appropriate coding mode based, at least in part, on the incoming base band video signal and decoded picture buffer signal, described further below, and/or may determine an appropriate coding mode on a per frame and/or macroblock basis. The mode decision may include macroblock type, intra modes, inter modes, syntax elements (e.g., transform coefficients, motion vectors), and/or quantization parameters. In some examples of the present invention, the mode decision block 430 may provide lambda for use by the optimizer 452. The mode decision block 430 may also utilize lambda in making mode decisions in accordance with examples of the present invention. In some embodiments, lambda may be common across mode decision block 430 and optimizer 452.

The output of the mode decision block 430 may be utilized by the prediction block 420 to generate the predictor in accordance with an encoding standard. The predictor may be subtracted from a delayed version of the video signal at the subtractor 404. Using the delayed version of the video signal may provide time for the mode decision block 430 to act. The output of the subtractor 404 may be a residual, e.g. the difference between a block and a prediction for a block.

The transform 406 may be configured to perform a transform, such as a discrete cosine transform (DCT), on the residual to transform the residual to the transform domain (e.g. frequency domain). As a result, the transform 406 may provide a coefficient block that may, for instance, correspond to spectral components of data in the video signal. For example, the coefficient block may include DC coefficient corresponding to a zero frequency component of the coefficient block that may, for instance, correspond to an average value of the block. The coefficient block may further include a plurality of AC coefficients corresponding to higher (non-zero) frequency portions of the coefficient block.

The quantization block 450 may be configured to receive the coefficient block and quantize the coefficients (e.g., DC coefficient and AC coefficients) of the coefficient block to produce a quantized coefficient block. The quantization provided by the quantization block 450 may be lossy in some examples. The optimizer 452 may be configured to receive the quantized coefficients and optimize the coefficients, for example using the methodology described above with respect to FIG. 3, and may also utilize lambda to adjust and/or optimize rate-distortion tradeoff for one or more coefficients of the coefficient block. Lambda may be received from the mode decision block 430, may be specified by a user, or may be provided by another element of the encoder 400. Lambda may be adjusted for each macroblock or for any other unit, and may be based on information encoded by the encoder 400 (e.g., video signals encoding advertising may utilize a generally larger lambda or smaller lambda inverse than video signals encoding detailed scenes). Accordingly, the optimizer 452 may provide an optimized coefficient block. The optimizer may be implemented using hardware, software, or combinations thereof. For example, the optimizer may include one or more processors and computer readable media (e.g. memory) encoded with executable instructions that, when executed, cause the one or more processors to perform the optimization techniques described above with reference to FIG. 3, including performing any of the cost and/or distortion computations described herein. In other examples, all or a portion of the optimizer may be implemented in hardware, for example, including logic gates configured to perform the described computations.

In at least one embodiment, the optimizer 452 may include a DC coefficient optimizer and an AC coefficient optimizer. The AC coefficient optimizer may be configured to receive one or more AC coefficients of a coefficient block and optimize the AC coefficients using a different methodology than the DC coefficient optimizer, which may receive DC coefficients and optimize the DC coefficients. For example, as described above, the AC coefficient optimizer may optimize the AC coefficients using a cost calculation based on an SSE or SAD metric while the DC coefficient optimizer may optimize DC coefficients using a cost calculation based on a SSIM metric (e.g. a brightness distortion).

In turn, the entropy encoder 408 may encode the optimized coefficient block to provide an encoded bitstream. The entropy encoder 408 may be any entropy encoder known by those having ordinary skill in the art or hereafter developed, such as a variable length coding (VLC) encoder. The optimized coefficient block may also be inverse scaled and quantized by the inverse quantization block 410. The inverse scaled and quantized coefficients may be inverse transformed by the inverse transform block 412 to produce a reconstructed residual, which may be added to the predictor at the adder 414 to produce reconstructed video. The reconstructed video may be provided to the decoded picture buffer 418 for use in future frames, and further may be provided from the decoded picture buffer 418 to the mode decision block 430 for further in-macroblock intra prediction or other mode decision methodologies.

In an example operation of the encoder 400, a video signal (e.g. a base band video signal) may be provided to the encoder 400. The video signal may be provided to the delay buffer 402 and the mode decision block 430. The subtractor 404 may receive the video signal from the delay buffer 402 and may subtract a motion prediction signal from the video signal to generate a residual signal. The residual signal may be provided to the transform 406 and processed using a forward transform, such as a DCT. As described, the transform 406 may generate a coefficient block that may be provided to the quantization block 450, and the optimizer 452 may optimize the coefficients of the coefficient block. Optimization of the coefficient block may utilize cost calculations involving multiple color components of a video signal, and in some examples optimization may include distortion metrics based on SSIM. Optimized coefficients may be provided to the entropy encoder 408 and thereby encoded into an encoded bitstream.

The optimized coefficient block may further be provided to the feedback loop of the encoder 400. The quantized coefficient block may be inverse quantized, inverse transformed, and added to the motion prediction signal by the inverse quantization block 410, the inverse transform 412, and the reconstruction adder 414, respectively, to produce a reconstructed video signal. The decoded picture buffer 418 may receive the reconstructed video signal, and provide buffered reconstructed video signals to the mode decision block 430 and the prediction block 420. Based, at least in part, on the reconstructed video signals, the prediction block 420 may provide a motion prediction signal to the subtractor 404.

Accordingly, the encoder 400 of FIG. 4 may provide a coded bitstream based on a video signal, where the coded bitstream is generated in part using optimized coefficients in accordance with embodiments of the present invention. The encoder 400 may be implemented in semiconductor technology, and may be implemented in hardware, software, or combinations thereof. In some examples, the encoder 400 may be implemented in hardware with the exception of the mode decision block 430 that may be implemented in software. In other examples, other blocks may also be implemented in software, however software implementations in some cases may not achieve real-time operation. Implementation in software may include implementations utilizing one or more processing units (e.g. processors) and memory or other storage encoded with computer executable instructions that, when executed, cause the one or more processing units to perform all or portions of the functionalities described herein.

Figure 5:
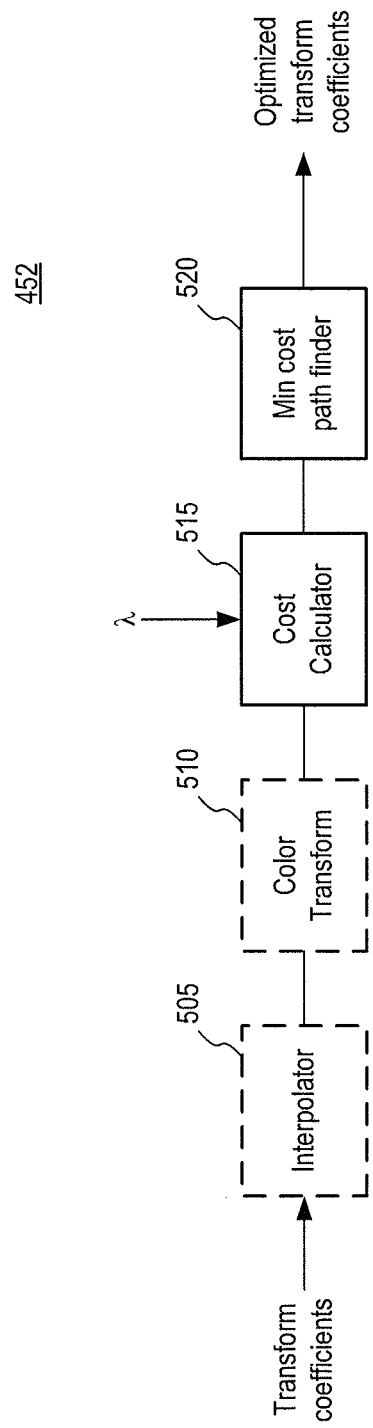
FIG. 5 is a schematic block diagram of an optimizer according to an embodiment of the present invention.

FIG. 5 is a schematic block diagram of the optimizer 452 of FIG. 4 according to an embodiment of the present invention. The optimizer 452 may receive transform coefficients and may include an interpolator 505. The interpolator may be used, for example, in embodiments where 4:2:0 or 4:2:2 content was received by the optimizer 452 and a color transform was desired. The interpolator 505 may perform an interpolation up to 4:4:4 data. Generally, the interpolator 505 may be included in embodiments where data is to be interpolated to facilitate transformation of the data from one color domain to another (e.g. YUV to RGB).

The optimizer 452 may further include a color transform 510. The color transform 510 may receive the transform coefficients or the interpolated transform coefficients and transform the data from one color domain to another (e.g. YUV to RGB). For example, as has been described above, data may be transformed from a color domain in which encoding is performed into a color domain in which the data is to be displayed.

The transformed data and any additional candidates may be provided to a cost calculator 515 included in the optimizer 452. In other examples where the interpolator and/or color transform are not present, the cost calculator 515 may receive the transform coefficients directly. In some examples, the color transform 510 may be integral with the cost calculator 515 and a color transformation may occur as part of the cost calculation. Candidates may be generated in any suitable manner. For example, a coefficient candidate set may be generated by taking the output of a standard quantizer and applying a number of offsets to each quantized coefficient, e.g. ±1, ±2, and/or ±3, thus creating several candidates for each coefficient individually. The output of the quantizer may or may not undergo a color transform.

The cost calculator 515 may compute a cost associated with different candidates for the transform coefficients, as has generally been described above. The cost may be computed using multiple color components of the video signal (e.g. received data). For example, as has been described above, the cost computation may include a sum of distortions due to each color component. The cost calculator 515 may receive lambda for use in calculating the cost. Example uses of lambda have been discussed above. The cost calculator 515 may compute costs using distortion metrics, which distortion metrics may be based on SSIM, examples of which have been described above.

The optimizer 452 may further include a minimum cost path finder 520. The minimum cost path finder 520 may find a minimum cost path (e.g. identify optimized transform coefficients) using costs provided by the cost calculator 515. Accordingly, optimized transform coefficients may be provided at an output of the minimum cost path finder 520.

While the optimizer 452 of FIG. 4 is shown positioned after the transform 406 and quantization 450 blocks, in some examples, the optimizer may be positioned in other locations, or utilize data generated at other locations of the encoder 400. For example, in some examples coefficients may be optimized in an image domain. Accordingly, distortion may be computed after the inverse transformation is performed, e.g. in block 412, and the prediction signal is added by the adder 414. Accordingly, in some examples data at an output of the adder 414 may be used by the optimizer 452 to perform a cost calculation. In some examples, a color transformation may be performed of the data at the output of the adder 414 prior to optimization or as part of optimization.

Accordingly, examples of the present invention include trellis optimization techniques that employ cost calculations involving the optimization of multiple color components jointly. In some examples, three color components (e.g. YUV or RGB) may be optimized jointly, while in other examples only two color components may be optimized jointly and another optimized individually. Three color components is provided by way of example, and any number may be used in other examples. Moreover, examples of the present invention include optimizers and trellis optimization techniques that calculate costs using a distortion metric based on an SSIM.

Cost calculations according to embodiments of the present invention may accordingly be more complicated than traditional trellis optimization techniques (e.g. those optimizing color components individually and/or utilizing only SAD or SSE distortion metrics). In some embodiments, different cost calculations may accordingly be selectively applied to a video signal (e.g. video data) based on a pre-analysis of the signal. Accordingly, optimizers according to the present invention may be configured to selectively apply cost calculations based on attributes of the video signal including, but not limited to, brightness (e.g. the Weber Fechner law indicates distortion may be far more apparent at dark areas than bright areas), texture (high vs. low), and motion. For certain portions of the video signal (e.g. dark areas, low texture, or low motion), the optimizer may be configured to apply an optimization technique according to an embodiment of the present invention while for other portions of the video signal (e.g. bright areas, high texture, or high motion), the optimizer may be configured to apply a more traditional optimization technique to conserve resources. For example, it may be desirable to reduce or eliminate banding in areas that are relatively homogeneous and characterized by smooth color gradients. Accordingly, an optimizer may be configured to optimize coefficients associated with those areas using a more complicated optimization technique described herein which in some examples may provide a more accurate result. In some examples, texture may be less important and the activity of the texture may mask coding artifacts. Accordingly, an optimizer may be configured to apply a standard optimization technique to textured areas where a simplified coefficient decision may be sufficient.

An object segmentation process may indicate where each different type of optimization technique (e.g. distortion calculation) should be used. For example, referring back to FIG. 4 a pre-processor may be provided (not shown) that may receive the video signal, perform object segmentation to identify regions suitable for higher complexity optimization (e.g. higher complexity distortion calculations) and regions suitable for lower complexity optimization (e.g. lower complexity distortion calculations such as SAD or SSE). The preprocessor may provide an indication to the optimizer 452 of which regions are to receive which type of optimization technique.

In other examples, optimizers arranged in accordance with embodiments of the present invention may apply an optimization technique based on available resource (e.g. power) of the system including the optimizer. For example, if power or processing resources are scarce, a more traditional optimization technique may be used (e.g. optimizing color components in isolation and/or utilizing a SAD or SSE distortion metric). However, when power and/or processing resource availability are above a particular threshold, optimization techniques described herein may be utilized by the optimizer including optimization of multiple color components jointly and/or distortion metrics based on SSIM. The optimizer may receive an indication of available processing resources by, for example, receiving a load signal indicative of a load on a processor that is configured to implement the optimization techniques. The load signal may in some examples be provided by the processor itself. The optimizer may receive an indication of power consumption of the system, e.g. of the encoder as a whole, by receiving a signal indicative of power consumption that may be provided, e.g. by a controller included in the encoder. Based on the load signal and/or the signal indicative of power consumption, the optimizer may apply a selected optimization technique to incoming coefficients. In this manner, optimization techniques may vary dynamically during operation of encoders described herein.

Moreover, examples have been described herein utilizing an example of optimizing a single block of transform coefficients. However, in other examples, optimizers may be provided that optimize transform coefficients over multiple blocks jointly. For example, a number of blocks may be optimized together, with the number of blocks being a fixed number for the optimizer in some examples that may be smaller or equal to a number of blocks in a megablock, slice, or picture. In other examples, a number of blocks optimized together may be adaptive as described above with respect to power or other resource availability or based on object segmentation.

Figure 6:
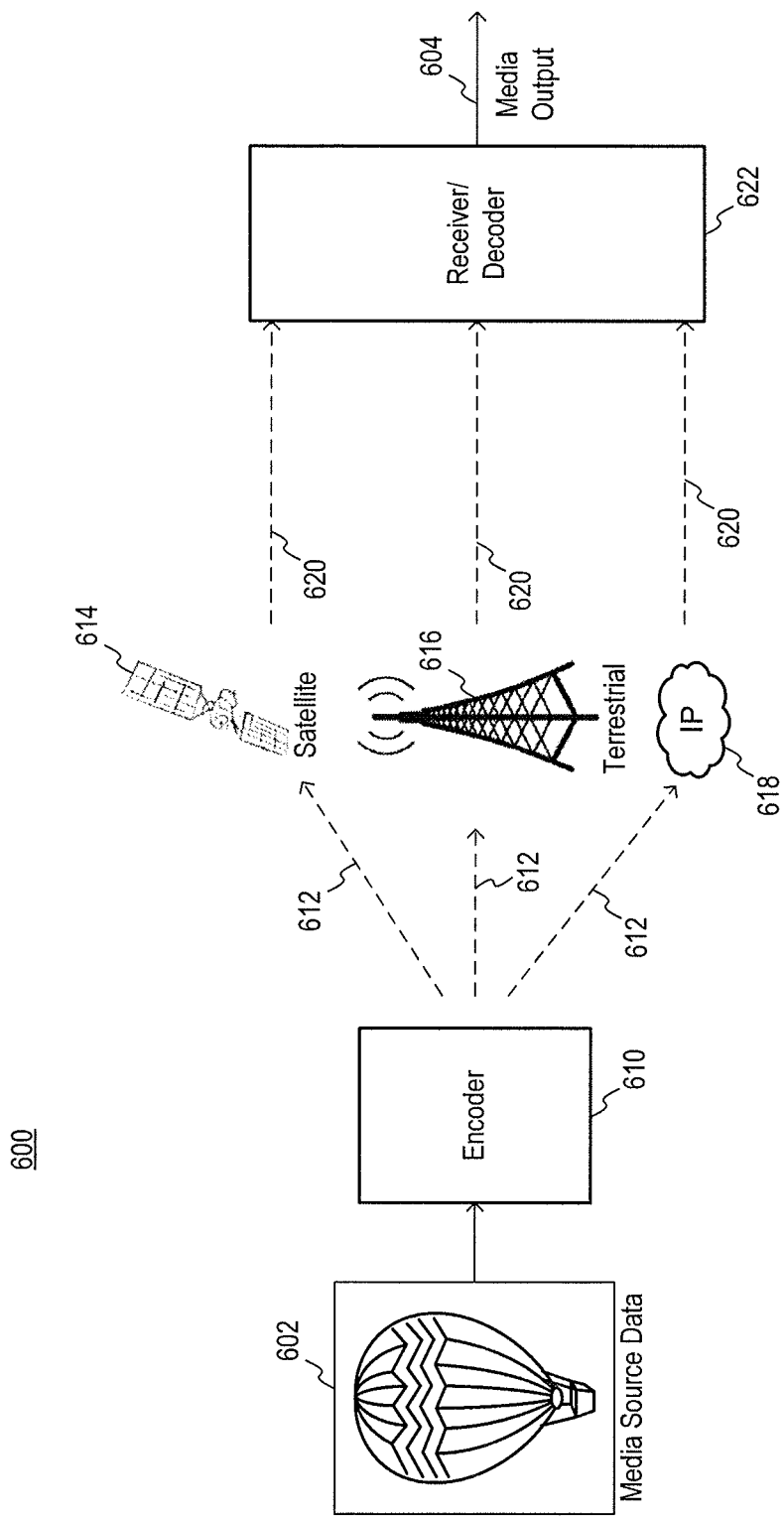
FIG. 6 is a schematic illustration of a media delivery system according to an embodiment of the invention.

FIG. 6 is a schematic illustration of a media delivery system in accordance with embodiments of the present invention. The media delivery system 600 may provide a mechanism for delivering a media source 602 to one or more of a variety of media output(s) 604. Although only one media source 602 and media output 604 are illustrated in FIG. 6, it is to be understood that any number may be used, and examples of the present invention may be used to broadcast and/or otherwise deliver media content to any number of media outputs.

The media source data 602 may be any source of media content, including but not limited to, video, audio, data, or combinations thereof. The media source data 602 may be, for example, audio and/or video data that may be captured using a camera, microphone, and/or other capturing devices, or may be generated or provided by a processing device. Media source data 602 may be analog or digital. When the media source data 602 is analog data, the media source data 602 may be converted to digital data using, for example, an analog-to-digital converter (ADC). Typically, to transmit the media source data 602, some type of compression and/or encryption may be desirable. Accordingly, an encoder 610 may be provided that may encode the media source data 602 using any encoding method in the art, known now or in the future, including encoding methods in accordance with video standards such as, but not limited to, MPEG-2, MPEG-4, H.264, HEVC, or combinations of these or other encoding standards. The encoder 610 may be implemented using any encoder described herein, including the encoder 100 of FIG. 1, the encoder of FIG. 4, and further may be used to implement the method 300 of FIG. 3, and any of the cost calculations and/or optimization techniques described herein.

The encoded data 612 may be provided to a communications link, such as a satellite 614, an antenna 616, and/or a network 618. The network 618 may be wired or wireless, and further may communicate using electrical and/or optical transmission. The antenna 616 may be a terrestrial antenna, and may, for example, receive and transmit conventional AM and FM signals, satellite signals, or other signals known in the art. The communications link may broadcast the encoded data 612, and in some examples may alter the encoded data 612 and broadcast the altered encoded data 612 (e.g. by re-encoding, adding to, or subtracting from the encoded data 612). The encoded data 620 provided from the communications link may be received by a receiver 622 that may include or be coupled to a decoder. The decoder may decode the encoded data 620 to provide one or more media outputs, with the media output 604 shown in FIG. 6.

The receiver 622 may be included in or in communication with any number of devices, including but not limited to a modem, router, server, set-top box, laptop, desktop, computer, tablet, mobile phone, etc.

The media delivery system 600 of FIG. 6 and/or the encoder 610 may be utilized in a variety of segments of a content distribution industry.

Figure 7:
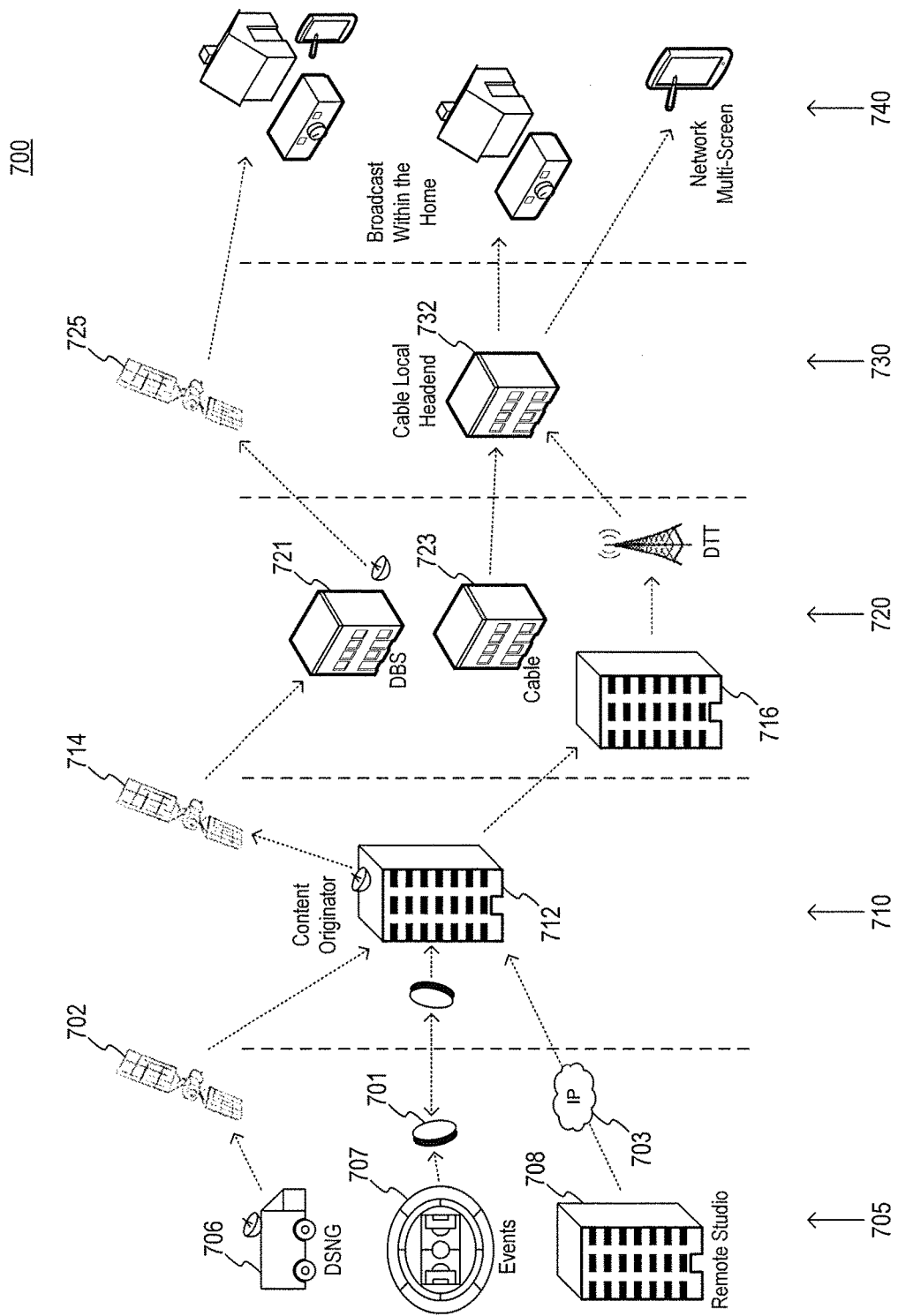
FIG. 7 is a schematic illustration of a video distribution system that may make use of encoders described herein.

FIG. 7 is a schematic illustration of a video distribution system that 700 may make use of encoders described herein. The video distribution system 700 includes video contributors 705. The video contributors 705 may include, but are not limited to, digital satellite news gathering systems 706, event broadcasts 707, and remote studios 708. Each or any of these video contributors 705 may utilize an encoder described herein, such as the encoder 610 of FIG. 6, the encoder 100 of FIG. 1, the encoder of FIG. 4, and further may be used to implement the method 300 of FIG. 3, and any of the cost calculations and/or optimization techniques described herein to encode media source data and provide encoded data to a communications link. The digital satellite news gathering system 706 may provide encoded data to a satellite 702 The event broadcast 707 may provide encoded data to an antenna 701. The remote studio 708 may provide encoded data over a network 703.

A production segment 710 may include a content originator 712. The content originator 712 may receive encoded data from any or combinations of the video contributors 705. The content originator 712 may make the received content available, and may edit, combine, and/or manipulate any of the received content to make the content available. The content originator 712 may utilize encoders described herein, such as the encoder 610 of FIG. 6, to provide encoded data to the satellite 714 (or another communications link). The content originator 712 may provide encoded data to a digital terrestrial television system 716 over a network or other communication link. In some examples, the content originator 712 may utilize a decoder to decode the content received from the contributor(s) 705. The content originator 712 may then re-encode data and provide the encoded data to the satellite 714. In other examples, the content originator 712 may not decode the received data, and may utilize a transcoder to change an encoding format of the received data.

A primary distribution segment 720 may include a digital broadcast system 721, the digital terrestrial television system 716, and/or a cable system 723. The digital broadcasting system 721 may include a receiver, such as the receiver 622 described with reference to FIG. 6, to receive encoded data from the satellite 714. The digital terrestrial television system 716 may include a receiver, such as the receiver 622 described with reference to FIG. 6, to receive encoded data from the content originator 712. The cable system 723 may host its own content which may or may not have been received from the production segment 710 and/or the contributor segment 705. For example, the cable system 723 may provide its own media source data 602 as that which was described with reference to FIG. 6.

The digital broadcast system 721 may include an encoder, such as the encoder 610 described with reference to FIG. 6, to provide encoded data to the satellite 725. The cable system 723 may include an encoder, such as the encoder 610 described with reference to FIG. 6, to provide encoded data over a network or other communications link to a cable local headend 732. A secondary distribution segment 730 may include, for example, the satellite 725 and/or the cable local headend 732.

The cable local headend 732 may include an encoder, such as the encoder 610 described with reference to FIG. 6, to provide encoded data to clients in a client segment 640 over a network or other communications link. The satellite 725 may broadcast signals to clients in the client segment 740. The client segment 740 may include any number of devices that may include receivers, such as the receiver 622 and associated decoder described with reference to FIG. 6, for decoding content, and ultimately, making content available to users. The client segment 740 may include devices such as set-top boxes, tablets, computers, servers, laptops, desktops, cell phones, etc.

Accordingly, encoding, transcoding, and/or decoding may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention.

What is claimed is:

1. A video encoder comprising:
   a transform circuit configured to transform a residual representation of a video signal in a spatial domain to a plurality of first transform coefficients in a frequency domain and a first color domain, wherein the video signal will be encoded in the first color domain; and
   an optimizer circuit configured to (i) generate a plurality of additional transform coefficients in the frequency domain and the first color domain by interpolating the first transform coefficients, (ii) generate a plurality of second transform coefficients by converting the first transform coefficients and the additional transform coefficients from the first color domain to a second color domain, wherein (a) the second color domain is different than the first color domain and (b) the video signal will be displayed in the second color domain, (iii) generate a plurality of candidate transform coefficients from each one of the second transform coefficients and (iv) generate a plurality of optimized transform coefficients from the first transform coefficients and the additional transform coefficients using a cost calculation based on rate and distortion, wherein the cost calculation includes a combination of distortion metrics calculated from the second transform coefficients and the candidate transform coefficients.

2. The video encoder of claim 1, further comprising an entropy encoder circuit configured to encode the optimized transform coefficients.

3. The video encoder of claim 1, wherein the first color domain is YUV and the second color domain is RGB.

4. The video encoder of claim 1, wherein the optimizer circuit comprises a color transform circuit configured to transform the first transform coefficients and the additional transform coefficients from the first color domain to the second color domain.

5. The video encoder of claim 4, wherein the optimizer circuit further comprises an interpolator circuit configured to interpolate at least portions of the video signal.

6. The video encoder of claim 1, wherein at least one of the distortion metrics is calculated based on a structural similarity index.

7. The video encoder of claim 6, wherein at least one of the distortion metrics comprises a brightness metric based on a DC coefficient of the first transform coefficients.

8. The video encoder of claim 1, wherein the optimizer circuit is further configured to perform the cost calculation including the combination of distortion metrics selectively based on object segmentation of the video signal.

9. The video encoder of claim 1, wherein the optimizer circuit is further configured to perform the cost calculation including the combination of distortion metrics selectively based on resource availability in the video encoder.

10. The video encoder of claim 1, wherein the combination of distortion metrics comprises a sum of distortions due to a plurality of chrominance components of the video signal.

11. A video encoder comprising:
    a transform circuit configured to transform a residual representation of a video signal in a spatial domain to a plurality of first transform coefficients in a frequency domain and a first color domain, wherein the video signal will be encoded in the first color domain; and
    an optimizer circuit configured to (i) generate a plurality of additional transform coefficients in the frequency domain and the first color domain by interpolating the first transform coefficients, (ii) generate a plurality of second transform coefficients by converting the first transform coefficients and the additional transform coefficients from the first color domain to a second color domain, wherein (a) the second color domain is different than the first color domain and (b) the video signal will be displayed in the second color domain, (iii) generate a plurality of candidate transform coefficients from each one of the second transform coefficients and (iv) generate a plurality of optimized transform coefficients from the first transform coefficients and the additional transform coefficients using a cost calculation based on a structural similarity index, wherein the cost calculation includes a combination of distortion metrics calculated from the second transform coefficients and the candidate transform coefficients.

12. The video encoder of claim 11, wherein the cost calculation based on the structural similarity index comprises calculating a brightness distortion metric.

13. The video encoder of claim 12, wherein the brightness distortion metric is based on a DC coefficient of the first transform coefficients.

14. The video encoder of claim 13, wherein the cost calculation based on the structural similarity index comprises a calculation of a texture distortion metric based on at least one AC coefficient of the first transform coefficients.

15. The video encoder of claim 11, wherein the optimizer circuit is further configured to (i) generate an optimized DC coefficient using the cost calculation based on the structural similarity index and (ii) generate a plurality of optimized AC coefficients using another cost calculation based on a sum of absolute differences or sum of square error.

16. A method comprising:
    transforming a residual representation of a video signal in a spatial domain to a plurality of first transform coefficients in a frequency domain and a first color domain using a circuit, wherein the video signal will be encoded in the first color domain;
    generating a plurality of additional transform coefficients in the frequency domain and the first color domain by interpolating the first transform coefficients;
    generating a plurality of second transform coefficients by converting the first transform coefficients and the additional transform coefficients from the first color domain to a second color domain, wherein (a) the second color domain is different than the first color domain and (b) the video signal will be displayed in the second color domain;
    generating a plurality of candidate transform coefficients from each one of the second transform coefficients;
    calculating a rate-distortion cost using a combination of distortions calculated from the second transform coefficients and the candidate transform coefficients; and generating a plurality of optimized transform coefficients from the first transform coefficients and the additional transform coefficients based on the rate-distortion costs, wherein the calculation of the rate-distortion cost includes a combination of distortion metrics calculated from the second transform coefficients and the candidate transform coefficients.

17. The method of claim 16, further comprising:
calculating the rate-distortion costs using at least one distortion metric based on a structural similarity index.

18. The method of claim 16, wherein the calculation of the rate-distortion costs comprises calculating costs for a plurality of luminance components of the video signal.

19. The method of claim 16, wherein (i) the first color domain is used by an encoder configured to encode the optimized transform coefficients and (ii) the second color domain is used by a display configured to display a received video signal based on the encoded optimized transform coefficients.

20. The method of claim 16, further comprising:
calculating the rate-distortion costs in the second color domain.

21. The method of claim 16, further comprising:
selectively calculating the rate-distortion cost using the combination of distortions associated with certain objects identified in the video signal by object segmentation.

* * * * *